(12) United States Patent
Ma et al.

(10) Patent No.: US 11,893,666 B2
(45) Date of Patent: Feb. 6, 2024

(54) PARALLEL CHART GENERATOR

(71) Applicant: International Business Machines Corporation, Armonk, NY (US)

(72) Inventors: Xiao Ming Ma, ShaanXi (CN); Si Er Han, Xi'an (CN); Xue Ying Zhang, Xi'an (CN); Jing Xu, Xi'an (CN); Wen Pei Yu, Xi'an (CN); Ji Hui Yang, Beijing (CN); Jing Jia, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 17/578,946

(22) Filed: Jan. 19, 2022

(65) Prior Publication Data

US 2023/0252699 A1 Aug. 10, 2023

(51) Int. Cl.
*G06T 11/20* (2006.01)
*G06F 7/08* (2006.01)
*G06F 16/28* (2019.01)

(52) U.S. Cl.
CPC .............. *G06T 11/206* (2013.01); *G06F 7/08* (2013.01); *G06F 16/287* (2019.01)

(58) Field of Classification Search
CPC ........ G06F 7/08; G06F 16/287; G06T 11/206
See application file for complete search history.

(56) References Cited

U.S. PATENT DOCUMENTS

| | | | |
|---|---|---|---|
| 10,853,383 B2 | 12/2020 | Agnew | |
| 2010/0191678 A1* | 7/2010 | Steed | G06T 11/206 706/11 |
| 2015/0365299 A1* | 12/2015 | Schaerges | G06Q 10/06 715/736 |
| 2016/0098173 A1* | 4/2016 | Slawinski | G06Q 30/02 715/739 |
| 2016/0359701 A1* | 12/2016 | Pang | H04L 47/32 |
| 2017/0032017 A1* | 2/2017 | Morinaga | G06F 16/283 |

FOREIGN PATENT DOCUMENTS

| | | |
|---|---|---|
| CN | 103092621 B | 8/2016 |
| WO | 2018174365 A1 | 9/2018 |

\* cited by examiner

*Primary Examiner* — Michelle L Sams
(74) *Attorney, Agent, or Firm* — Van Leeuwen & Van Leeuwen; Kimberly Zillig

(57) ABSTRACT

An approach is provided in which the approach generates a parallel chart based on multiple records that includes a set of variable values corresponding to a set of variables. To generate the parallel chart, the approach arranges the set of variables on the parallel chart in a variable order based on at least one variable arrangement rule. The approach arranges an initial variable value order for each one of the set of variables, and computes a lucidity score based on the variable order and the initial variable value order of each of the set of variables. The lucidity score is a measurement of the clarity of the parallel chart. The approach adjusts the variable value order of at least one of the set of variables to increase the lucidity score and optimizes the clarity of the parallel chart based on the adjusted variable value order.

20 Claims, 9 Drawing Sheets

Score Value Computation
Pseudo-code
900

```
Score = 0
for two adjacent variables in all adjacent variables
    for two record lines in all record lines
        get points(x1, y1), (x3, y3) in first line and points((x2, y2), (x4, y4) ) in second line
        check whether line((x1, y1), (x3, y3) ) and ((x2, y2), (x4, y4) )  cross
        if ( cross)
                weighting += sin(angle)
                Score=1/weighting
```

Variable Value Order Adjustment
Pseudo-code
950

```
for one variable V in all nominal variables
    for one value v1 in all values of the variable V
        for value v2 in left values of the variable V
            exchange the position of v1 and v2, the v1 and v2 Pixel position value (x, y) changed
            re-compute the lucidity score value of V and two adjacent variable score_V
            if ( score_V become smaller)
                keep the exchange
            else
                no exchange
```

PARALLEL CHART GENERATOR

BACKGROUND

Parallel charts provide a common way to visualize and analyze high-dimensional datasets. To show a set of points in an n-dimensional space, a parallel chart typically includes a backdrop of n parallel lines that are vertical and equally spaced. Parallel charts are useful visual presentations when analyzing multivariate data, which involves analyzing multiple dependent variables and producing one outcome.

Parallel charts appear similar to time-series charts except that parallel charts are applied to time independent data and therefore their variable axes do not have a natural order. As such, different axes arrangements are possible and may be of interest depending on the type of data. When used for statistical data visualization, a user typically considers the order, the rotation, and the scaling of the axes to generate a parallel chart.

The order of the axes is critical for identifying features. However, many re-orderings are typically required in traditional data analysis. Clever order arrangement greatly improves the readability of the parallel chart and uncovers feature insights that otherwise are difficult to recognize.

BRIEF SUMMARY

According to one embodiment of the present disclosure, an approach is provided in which the approach generates a parallel chart based on multiple records that includes a set of variable values corresponding to a set of variables. To generate the parallel chart, the approach arranges the set of variables on the parallel chart in a variable order based on at least one variable arrangement rule. The approach arranges an initial variable value order for each one of the set of variables, and computes a lucidity score based on the variable order and the initial variable value order of each of the set of variables. The lucidity score is a measurement of the clarity of the parallel chart. The approach adjusts the variable value order of at least one of the set of variables to increase the lucidity score and optimizes the clarity of the parallel chart based on the adjusted variable value order.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 9 is an exemplary diagram depicting pseudo-code for computing a lucidity score and for adjusting a variable value order.

DETAILED DESCRIPTION

Figure 1:
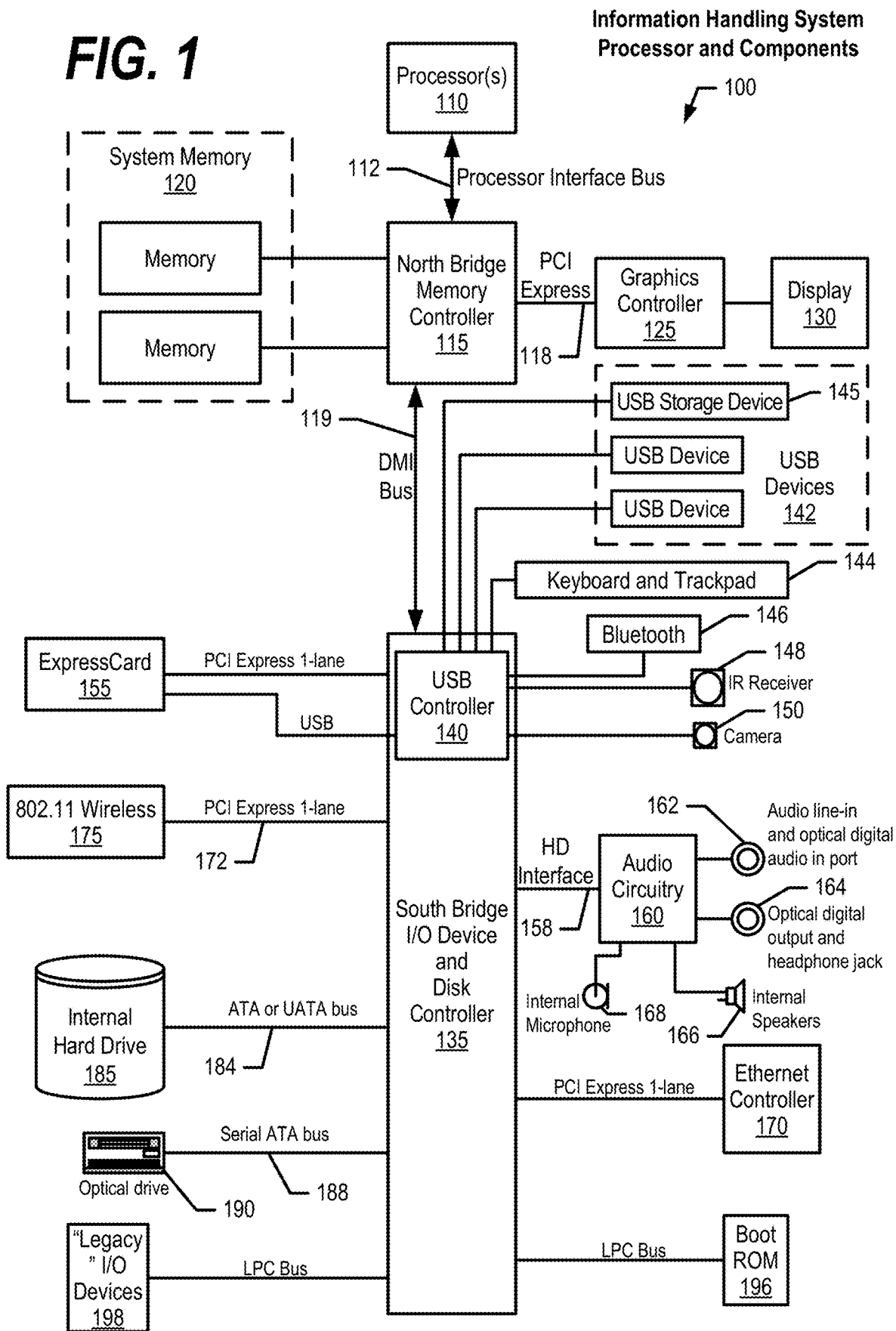
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wirelessly communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
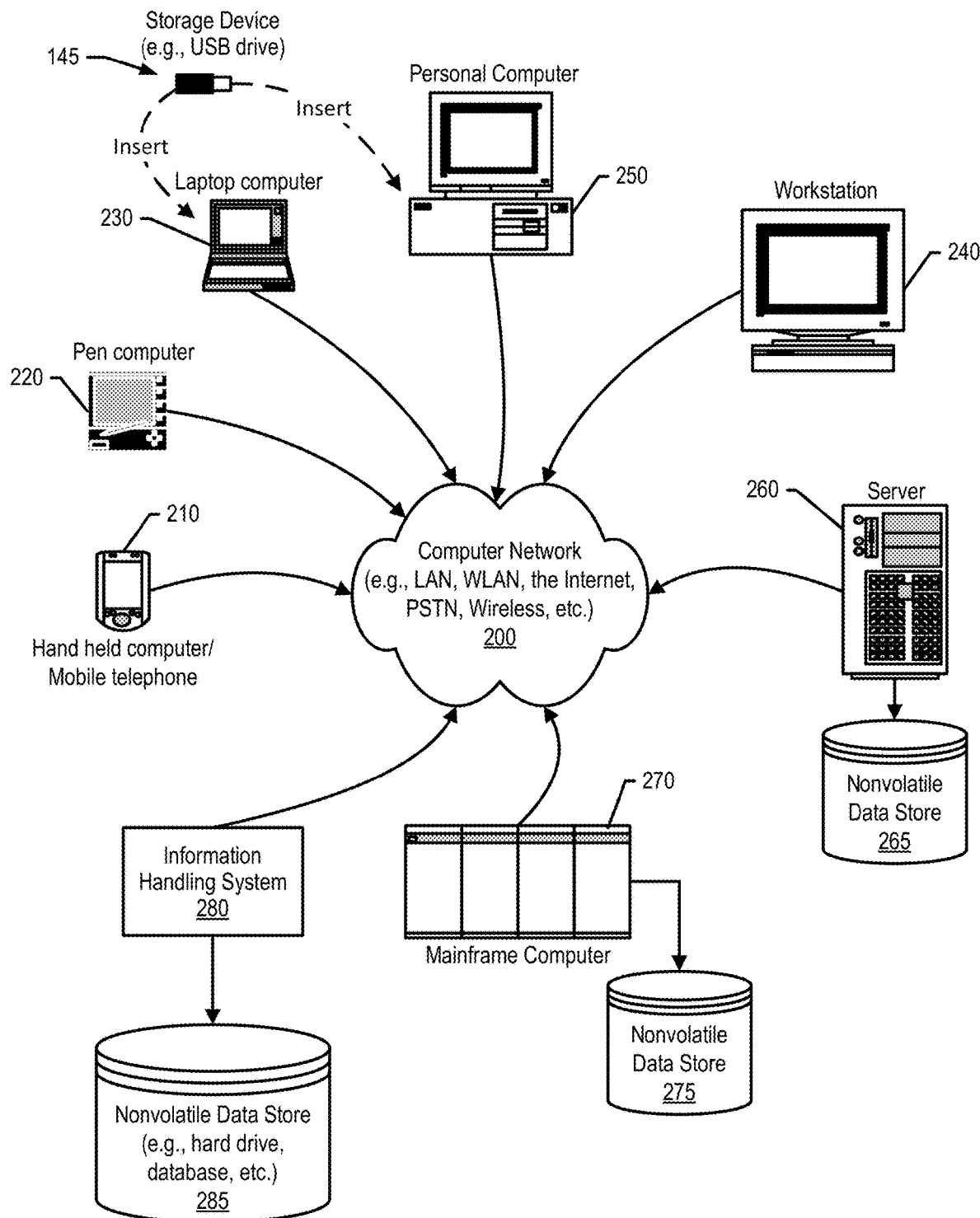
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, parallel charts are useful visual presentations to analyze multivariate data. Parallel charts resemble line charts for data and optimizing the arrangement of the orders of the points greatly improves the readability of the chart to uncover feature insights that otherwise are difficult to recognize. A challenge found with creating parallel charts is that arranging a substantial amount of points by a user is difficult, time-consuming, if not unfeasible, due to the enormous amount of multivariate data arrangements.

FIGS. 3 through 9 depict an approach that can be executed on an information handling system that automatically generates and optimizes a parallel chart's visual clarity. The approach identifies a variable order that has a higher visual clearness and effectiveness, and then uses a clustering technique to compute an initial variable value order of each of the variables. The approach then generates different variable value arrangements and computes corresponding evaluation statistics (e.g., lucidity score). In turn, the approach identifies the best arrangement, generates the effective parallel chart based on the best arrangement, and provides data insights to the user based on the parallel chart.

As defined herein, a user success impracticability threshold is a level at which it is impractical for a user to successfully visually optimize a parallel chart. In one embodiment, the user success impracticability threshold is i) when the number of records is more than 200; ii) the number of variables is more than 20, iii) the number of total data points is more than 300; or iv) the average number of variable value points of each variable is more than 15.

Figure 3:
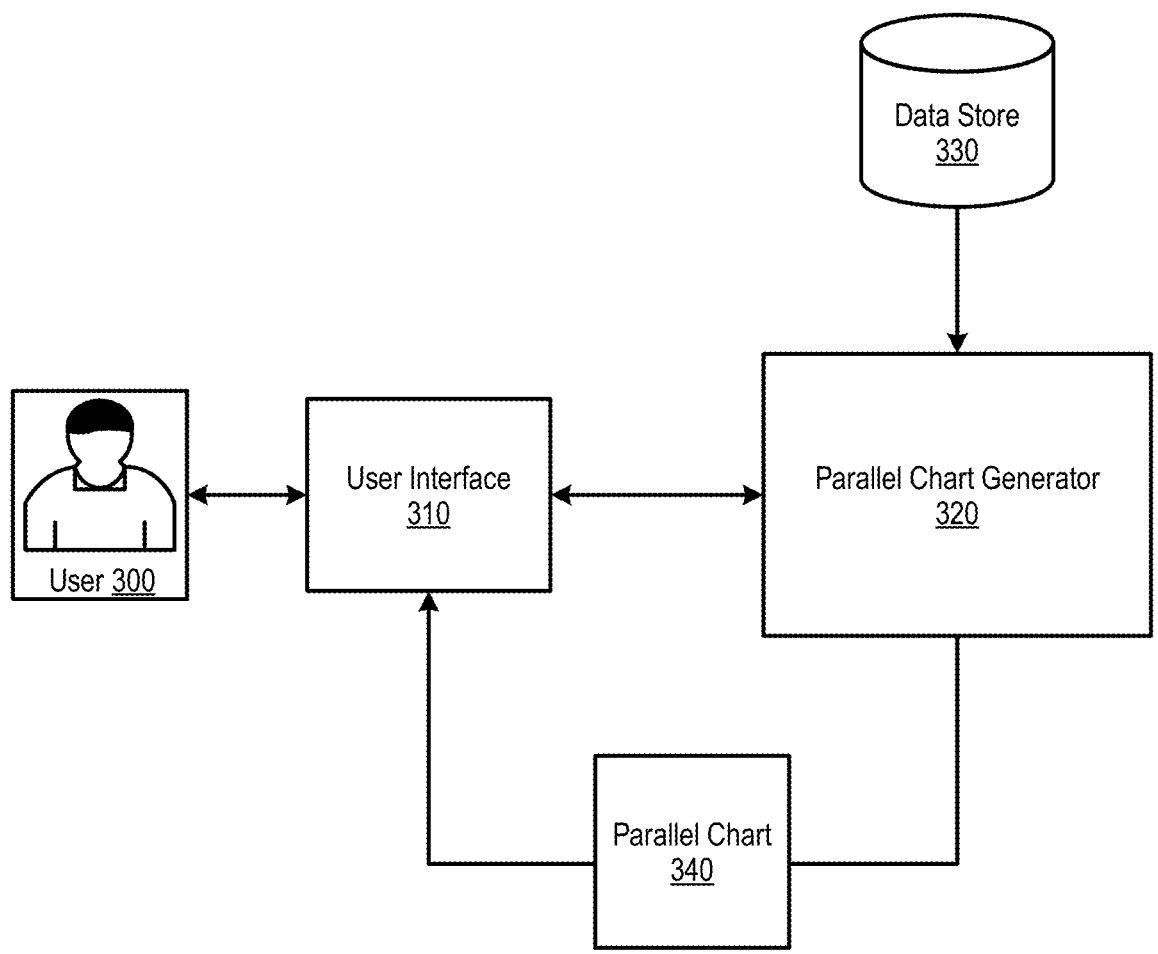
FIG. 3 is a high level diagram depicting a parallel chart generator receiving user input and automatically generating and optimizing a parallel chart.

FIG. 3 is a high level diagram depicting a parallel chart generator receiving user input and automatically generating and optimizing a parallel chart. Parallel chart generator 320 receives input from user 300 via user interface 310 and then determines a variable order. In one embodiment, parallel chart generator 320 determines a variable order based on a variable arrangement rule selected by user 300 such as a Predictor Importance (PI) rule, an information convergence rule, a feature importance and distinct values number combination rule, or a spindle shape layout rule. In another embodiment, the spindle shape layout is a default selection and the major crossing is placed in the middle of the parallel chart for optimized clarity.

Figure 6:
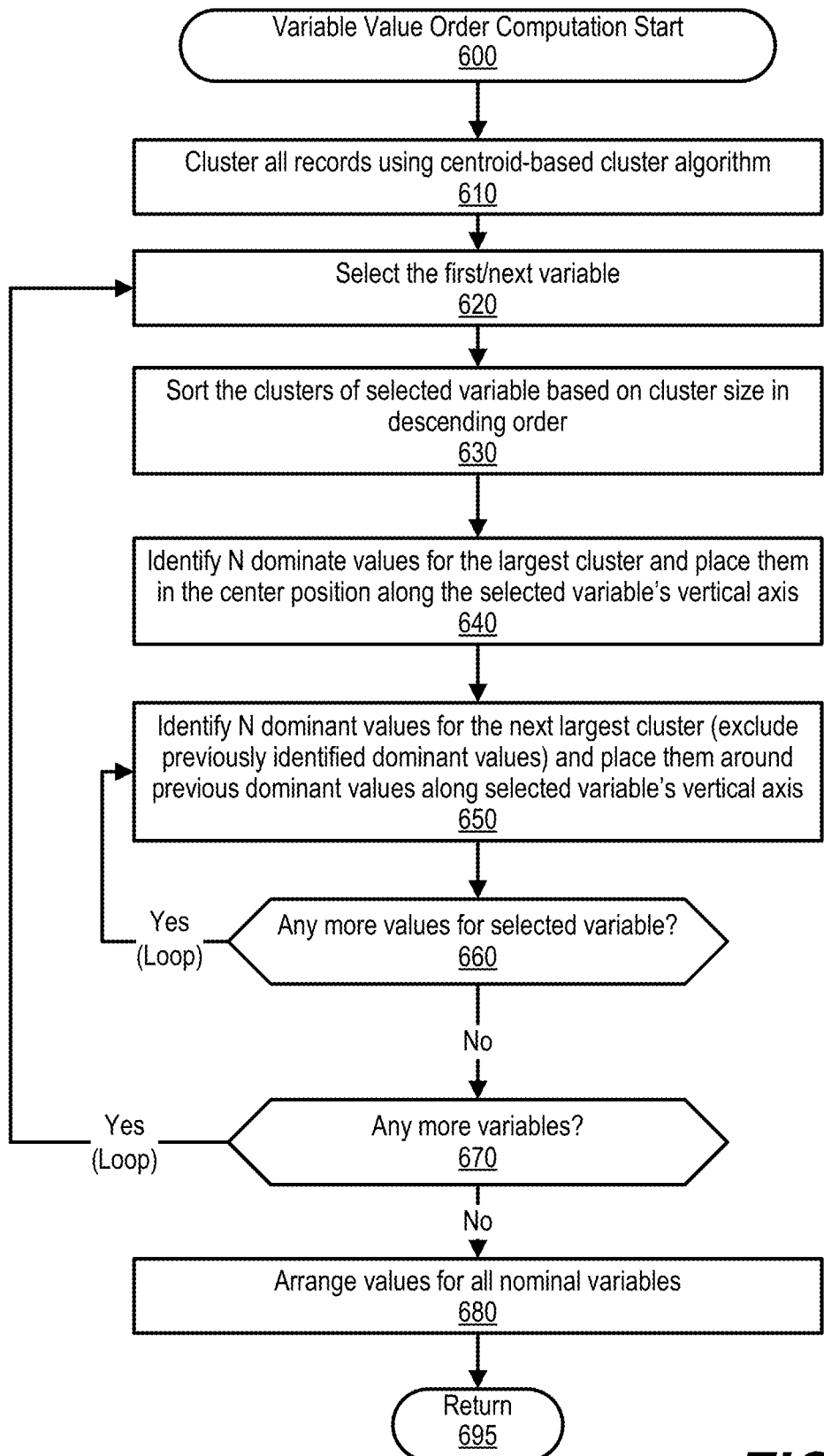
FIG. 6 is an exemplary flowchart showing steps taken to compute variable value orders for each variable.
Figure 7:
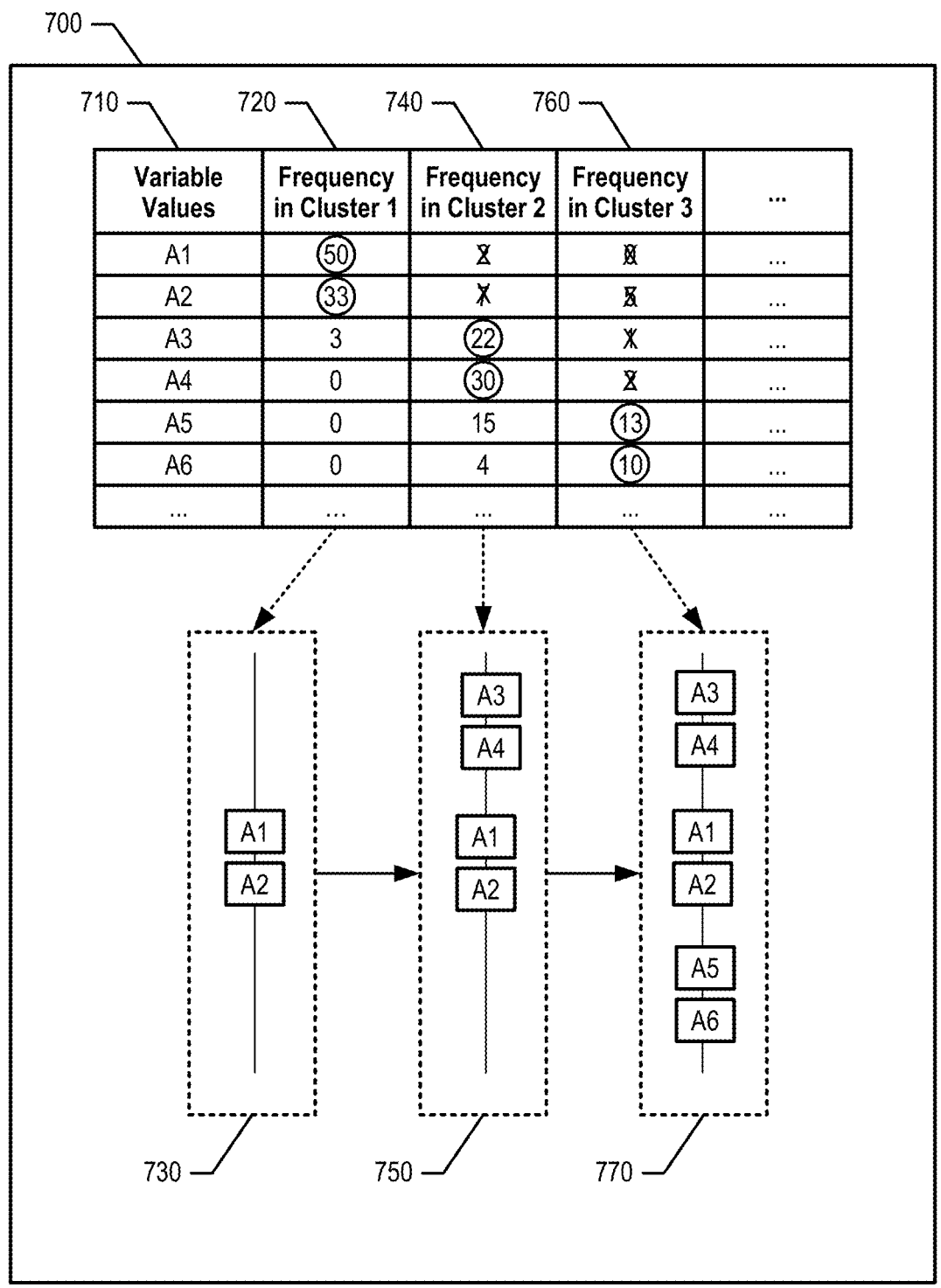
FIG. 7 is an exemplary diagram depicting iterative steps taken to cluster variable values and arrange the variable values along a variable's corresponding vertical axis.

Parallel chart generator 320 then performs steps to compute an initial variable value order for each of the variables (see FIGS. 6, 7 and corresponding text for further details). In one embodiment, parallel chart generator 320 clusters the input records from data store 330 and arranges them in the order of value for each nominal variable. In one embodiment, parallel chart generator 320 clusters the result to ensure dominant values in the same cluster are together (see FIG. 7 and corresponding text for further details).

Figure 8:
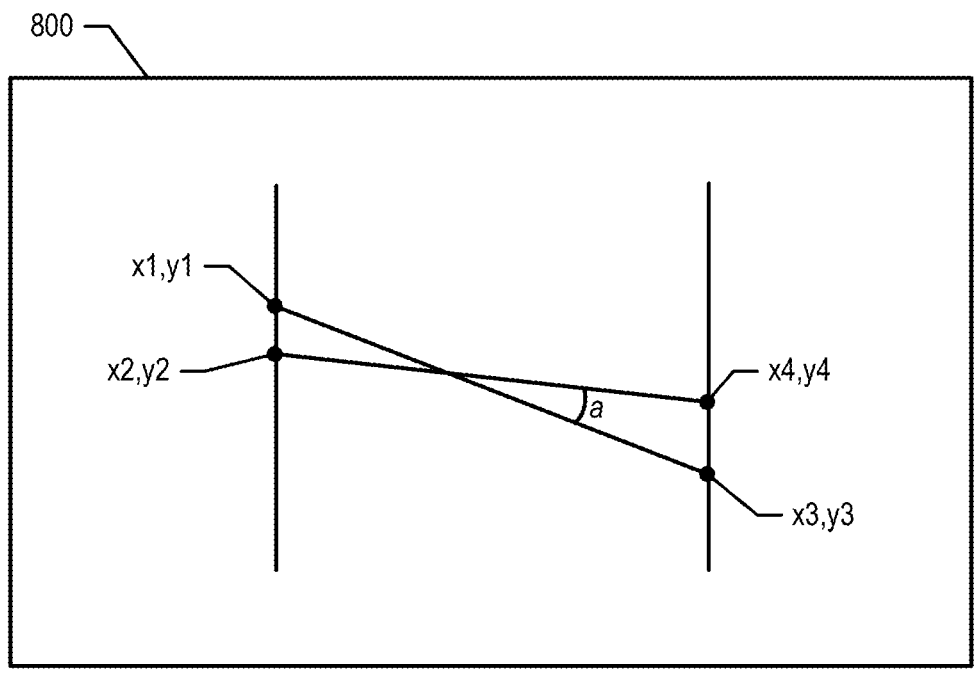
FIG. 8 is an exemplary diagram depicting an approach of computing crossing line segment weightings for crossing line segments.
Figure 8:
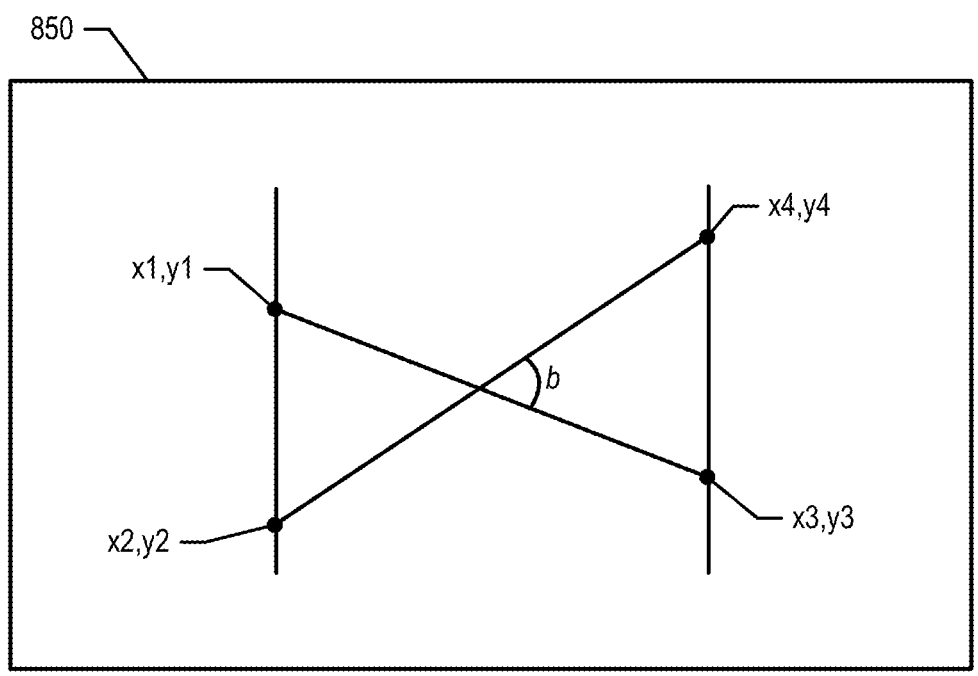

Then, parallel chart generator 320 computes a lucidity score of the parallel chart based on a number of cross of parallel lines and angle of the crossed lines (see FIG. 8 and corresponding text for further details). As defined herein, a lucidity score measures the intelligibility and clarity of a parallel chart.

Parallel chart generator 320 then adjusts the variable value order for each nominal variable arrangement possibility and selects the arrangement that generates a highest lucidity score. Parallel chart generator 320 then provides the parallel chart with the highest lucidity score as a final parallel chart (parallel chart 340).

Figure 4:
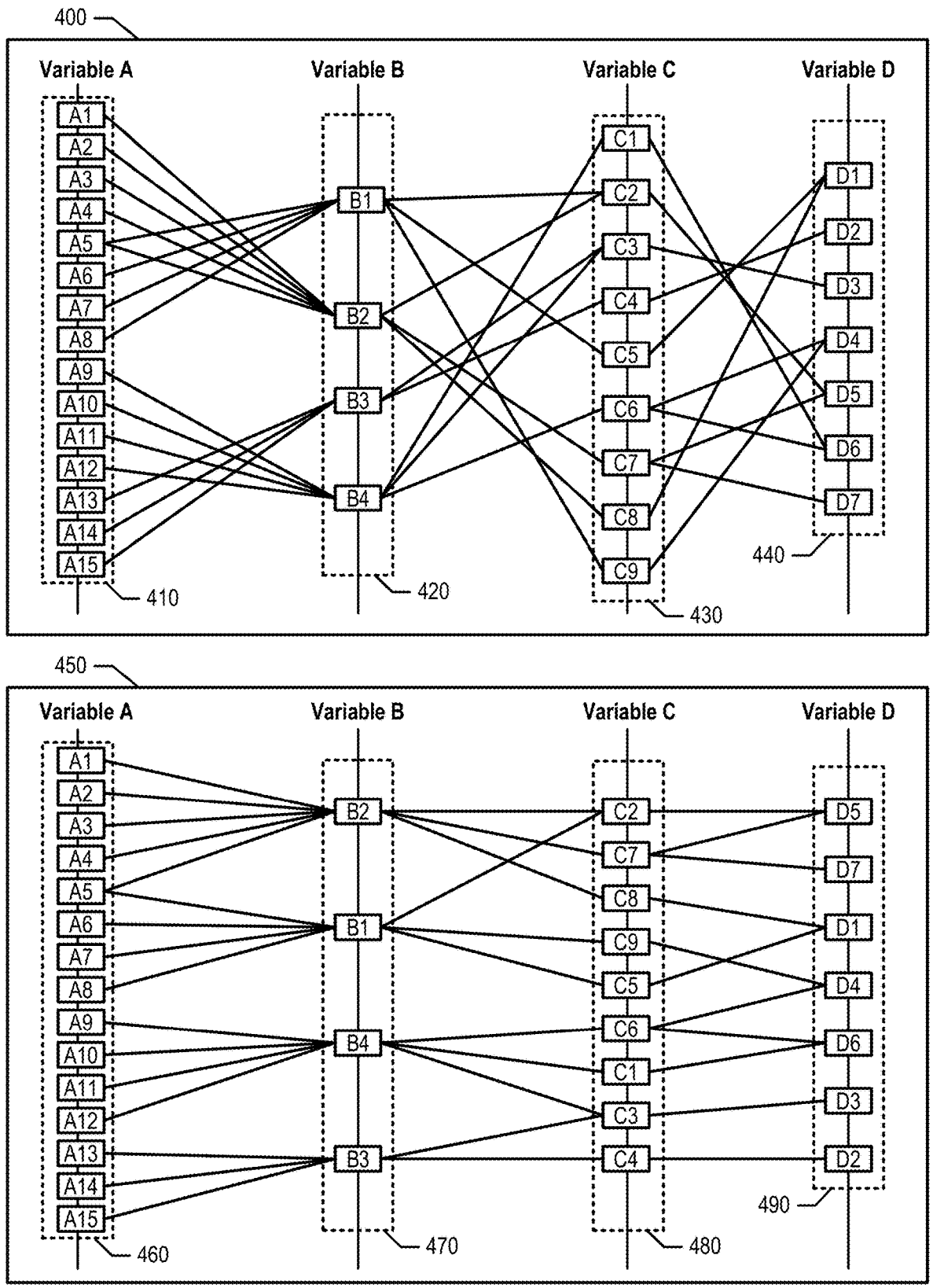
FIG. 4 is an exemplary diagram depicting a parallel chart that arranges variables in a variable order based on a variable arrangement rule and arranges each one of the variable's values along a vertical axis to optimize the lucidity of the parallel chart.

FIG. 4 is an exemplary diagram depicting results of a first stage and a second stage of generating an optimized parallel chart. The first stage (chart 400) arranges variables in a variable order based on a variable arrangement rule, and the second stage (chart 450) further arranges each one of the variable's values along a vertical axis to optimize the lucidity of the parallel chart.

Chart 400 shows that parallel chart generator 320 arranges the variables in order of A, B, C, and D based on a variable arrangement rule such as Predictor Importance, Information Convergence, etc. (see FIG. 5 and corresponding text for further details). Parallel chart generator 320 then arranges, for each variable, the variable values in an initial order. Order 410 shows, for variable A, an initial order of A1, A2, A3, . . . A15. Order 420 shows, for variable B, an initial order of B1, B2, B3, B4. Order 430 shows, for variable C, an initial order of C1, C2, C3, . . . C9. And, order 440 shows, for variable D, an initial order of D1, D2, D3, . . . D7. As can be seen, the initial variable value orders cause chart 400 as a whole to be visually difficult to comprehend.

To improve the visual comprehension of chart 400, parallel chart generator 320 iteratively computes lucidity scores to determine variable value orders for each variable to create an optimized visual parallel chart 450. Referring to chart 450, parallel chart generator 320 determines that order 460 is optimized (same as order 410) by rearranging variable B's value order from order 420 to order 470 to generate the highest lucidity score between variable A and variable B. In another embodiment, parallel chart generator 320 arranges both variable A's value order and variable B's value order. As can be seen, chart 450's connections between variable A and variable B are more lucid than chart 400's connections between variable A and variable B.

Then, parallel chart generator 320 analyzes connections between variable B and variable C to determine variable C's value order (order 480) that produces the highest lucidity score between variable B and variable C. As can be seen, chart 450's connections between variable B and variable C are more lucid than chart 400's connections between variable B and variable C.

Parallel chart generator 320 then analyzes connections between variable C and variable D to determine variable D's value order (order 490) that produces the highest lucidity score. As can be seen, chart 450's connections between variable C and variable D are more lucid that chart 400's connections between variable C and variable D. As such, chart 450 is more visually understandable (more lucid) than chart 400.

In one embodiment, instead of individually analyzing connections between two variables, parallel chart generator 320 analyzes the connections in totality between all of the variables to generate an optimized parallel chart. For example, parallel chart generator 320 may adjust the positioning of variable values B1-4, C1-9, and D1-7 to derive an optimized parallel chart.

Figure 5:
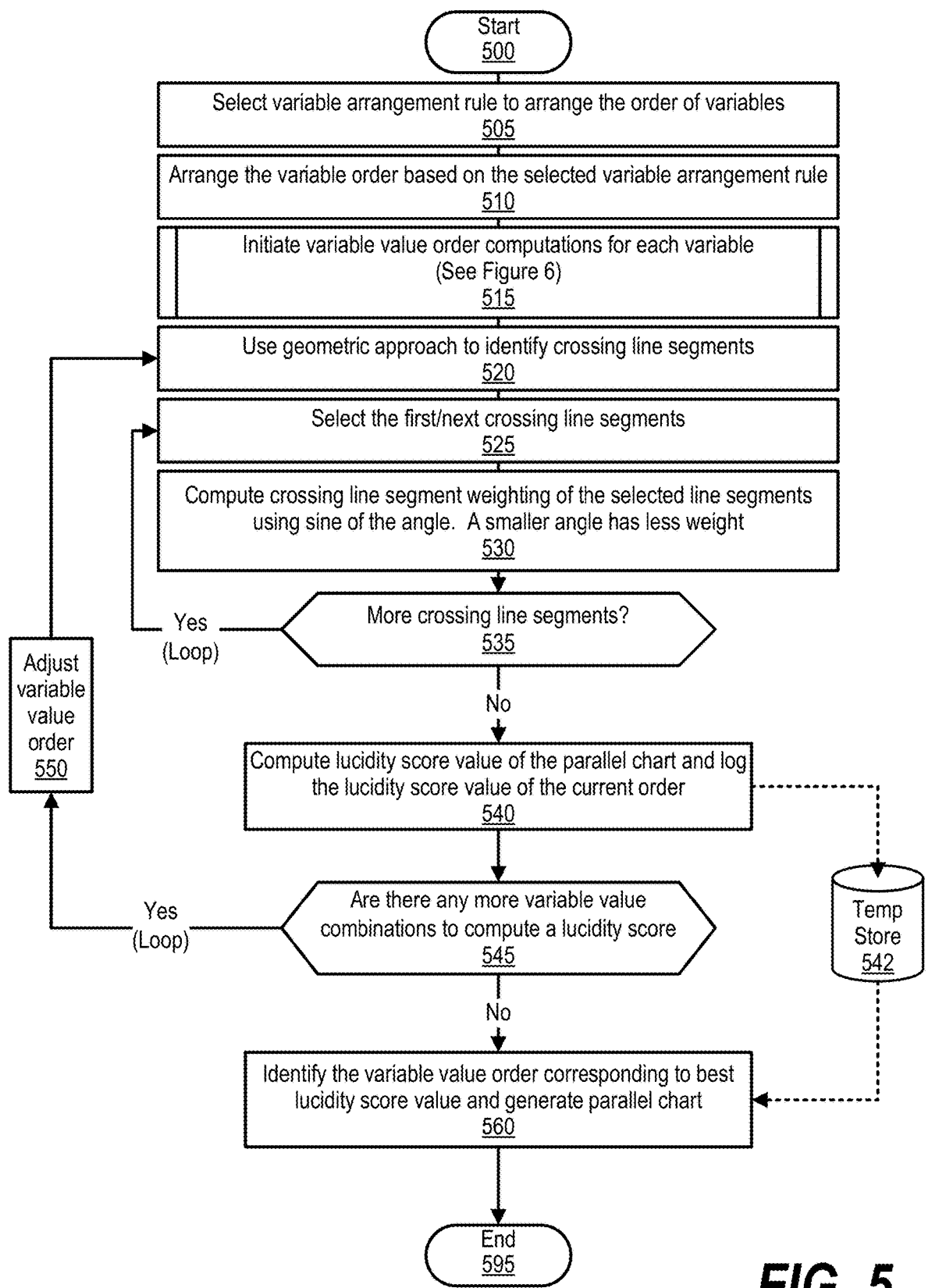
FIG. 5 is an exemplary flowchart showing steps taken to generate and optimize a parallel chart.

FIG. 5 is an exemplary flowchart showing steps taken to generate and optimize a parallel chart. FIG. 5 processing commences at 500 whereupon, at step 505, the process selects a variable arrangement rule to arrange the order of variables. In one embodiment, user 300 has an option to select one of the following pre-defined variable arrangement rules:

Predictor Importance (PI): Arrange variables from left to right in ascending order of PI and put target in far right if it exist;

Information convergence: Arrange variables from left to right in descending order of number of distinct values and put target in far right if it exist;

Feature importance and distinct values number combination: Define for each variable: x=normalized PI/# of distinct values;

Spindle shape layout: Define for each variable: x=normalized PI/# of distinct values and put smallest value variable in center and largest value variable in both side.

At step 510, the process arranges the variable order based on the selected variable arrangement rule. At predefined process 515, the process initiates variable value order computations for each variable to determine value locations along each variable column (see FIG. 6 and corresponding text for processing details). In one embodiment, the process uses a centroid-based clustering algorithm to arrange the variable values along a variable axis.

At step 520, in one embodiment, the process uses a geometric approach to identify crossing line segments (see FIG. 8 and corresponding text for further details). At step 525, the process selects the first identified crossing line segments and, at step 530, the process computes a crossing line segment weighting of the selected line segments using a sine function of the angle where a smaller angle has less weighting (see FIGS. 8, 9, and corresponding text for further details).

The process determines as to whether there are more crossing line segments (decision 535) to process. If there are more crossing line segments to process, then decision 535 branches to the 'yes' branch which loops back to select and process the next crossing line segment. This looping continues until there are no more crossing line segments to process, at which point decision 535 branches to the 'no' branch exiting the loop. At step 540, the process computes a lucidity score of the initial parallel chart and logs the lucidity score in temp store 542 accordingly.

The process determines as to whether there are any more variable value order combinations to compute a lucidity score (decision 545). In one embodiment, for a variable with n values, the number of times that the process adjusts the variable values locations is n*(n−1)/2.

If there are more variable value order combinations for which to compute a lucidity score, then decision 535 branches to the 'yes' branch which loops back to adjust the variable value order (step 550) and compute another lucidity score. This looping continues until there are no more variable value order combinations to compute a lucidity score, at which point decision 545 branches to the 'no' branch exiting the loop.

At step 560, the process identifies the variable value order corresponding to best lucidity score value and generate parallel chart. FIG. 5 processing thereafter ends at 595.

FIG. 6 is an exemplary flowchart showing steps taken to compute variable value orders for each variable. FIG. 6 processing commences at 600 whereupon, at step 610, the process clusters all records using, in one embodiment, a centroid-based cluster algorithm. At step 620, the process selects the first variable and, at step 630, the process sorts the clusters of the selected variable based on cluster size in descending order.

At step 640, the process identifies N dominate values for the largest cluster and places the largest cluster in the center position along the selected variable's vertical axis (see FIG. 7, reference numeral 730, and corresponding text for further details). At step 650, the process identifies N dominant values for the next largest cluster (exclude previously identified dominant values) and places them around previous dominant values along selected variable's vertical axis (see FIG. 7, reference numeral 750, and corresponding text for further details).

The process determines as to whether there are any more values for the selected variable (decision 660). If there are any more values for the selected variable, then decision 660 branches to the 'yes' branch which loops back to identify and process the next N dominant values for the next largest cluster. This looping continues until there are no more values to process for the selected variable, at which point decision 660 branches to the 'no' branch exiting the loop.

The process determines as to whether there are any more variables to process (decision 670). If there are any more variables to process, then decision 670 branches to the 'yes' branch which loops back to select and process the next variable. This looping continues until there are no more variables to process, at which point decision 670 branches to the 'no' branch exiting the loop.

At step 680, the process arranges the values for all nominal variables and FIG. 6 processing thereafter returns to the calling routine (see FIG. 5) at 695.

FIG. 7 is an exemplary diagram depicting iterative steps taken to cluster variable values and arrange the variable values along a variable's corresponding vertical axis.

Parallel chart generator 320 clusters all records using a centroid-based cluster algorithm such as K-mean clustering. Parallel chart generator 320 then sorts the clusters based on cluster size in descending order. Then, for a given variable, parallel chart generator 320 arranges its variable values based on specific parameters. Diagram 700 shows an arrangement of variable values for the variable "A" on variable A's vertical axis.

Parallel chart generator 320 identifies N dominant values for the largest cluster (e.g., N=2) and places them in the center position along the vertical axis for the variable. FIG. 7 reference numeral 730 shows that variable values A1 and A2 are placed in the center position due to their order in column 720.

Then, parallel chart generator 320 excludes values that are identified as dominant values (A1, A2), and identifies the next N dominant values for the next largest cluster (740). Reference numeral 750 shows that A3 and A4 are placed together adjacent to A1 and A2. Parallel chart generator 320 iteratively excludes previously selected variable values, sorts the remaining variable values, identifies the next N dominant values, and places the identified N dominant values on the vertical axis. Column 760 shows that A5 and A6 are the next variable values to place adjacent to A1 and A2 on the vertical axis, which is shown in reference numeral 770. Parallel chart generator 320 performs the steps shown in FIG. 7 for each variable to generate the parallel chart.

FIG. 8 is an exemplary diagram depicting an approach of computing crossing line segment weightings for crossing line segments. As discussed herein, during lucidity score computations, parallel chart generator 320 determines the number of line crosses between two adjacent variables and the cross angle between two crossing line segments. FIG. 8 shows two embodiments of crossing line segments wherein crossing line segments 800 cross at a smaller angle "a" compared to line segments 850 that cross at a larger angle "b".

Referring to crossing line segments 800, parallel chart generator 320 uses coordinates (x1,y1), (x2,y2), (x3,y3), and (x4,y4) to first determine if the two line segments cross. Then, parallel chart generator 320 uses the same coordinates to compute a weighting using sin(a) and assign the weighting to crossing line segment. For example, based on the four coordinates, assuming angle a=15 degrees, the weighting of the cross is sin(15)=0.26.

Referring to crossing line segments 850, parallel chart generator 320 uses coordinates (x1,y1), (x2,y2), (x3,y3), and (x4,y4) to first determine if the two line segments cross. Then, parallel chart generator 320 uses the same coordinates to compute a weighting using sin(b) and assign the weighting to crossing line segment. For example, based on the four coordinates, assuming angle b=50 degrees, the weighting is sin(50)=0.77. As can be seen in this embodiment, a larger angle generates a larger weighting because the larger angle intersections cause the parallel chart to be less lucid.

In turn, once parallel chart generator 320 evaluates each of the line intersections and computes weightings, parallel chart generator 320 computers an overall lucidity score for the parallel chart (see FIG. 9 and corresponding text for further details).

FIG. 9 is an exemplary diagram depicting pseudo-code for computing a lucidity score and for adjusting a variable value order. Pseudo-code 900 selects a set of crossing line segments between two adjacent variables and computes a weighting based on the intersection angle. In one embodiment, as discussed herein, the 'weight of the cross' is a sine value of the angle formed between the two line segments. Then, in one embodiment, pseudo-code 900 takes the inverse of the weighting to compute the lucidity score so that a smaller angle results in a higher lucidity score.

Pseudo-code 950 adjusts variable value orders of a variable to increase the overall lucidity score. Pseudo-code 950 exchanges positions of variable values for a given variable and determines whether the exchange increases the lucidity score. Parallel chart generator 320 keeps the exchange if the lucidity score increases, otherwise parallel chart generator 320 does not keep the exchange.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A computer-implemented method comprising:
    generating, by an information handling system comprising one or more processors, a memory coupled to at least one of the processors, and a set of computer instructions stored in the memory and executed by at least one of the processors, a parallel chart based on a plurality of records, wherein each one of the plurality of records comprises a plurality of variable values corresponding to each one of a plurality of variables, and wherein the generating further comprises:
        arranging a variable value order of each one of the plurality of variable values, resulting in a plurality of variable value orders corresponding to the plurality of variables;
        computing a lucidity score of the parallel chart based on the plurality of variable value orders, wherein the lucidity score is a visual clarity measurement of the parallel chart; and
        adjusting at least one of the variable value orders of at least one of the variables to increase the lucidity score of the parallel chart.

2. The method of claim 1 wherein, prior to arranging the variable value order of each one of the plurality of variable values, the generating further comprises:
    arranging the plurality of variables in a variable order based on at least one variable arrangement rule selected from the group consisting of a predictor importance rule, an information convergence rule, a feature importance and distinct values number combination rule, and a spindle shape layout rule.

3. The method of claim 1 wherein the generating further comprises:
    selecting a first set of variable values and a second set of variable values from the plurality of variable values, wherein the first set of variable values corresponds to a first one of the plurality of variables and the second set of variable values corresponds to a second one of the plurality of variables;
    generating a plurality of line segments between the first set of variable values and the second set of variable values based on the plurality of records;
    in response to detecting one or more line segment crossings of the plurality of line segments, computing one or more weightings of the one or more line segment crossings based on their corresponding intersection angle; and
    computing the lucidity score utilizing the one or more weightings.

4. The method of claim 1 wherein the generating further comprises:
    clustering the plurality of records using a centroid-based cluster algorithm;
    selecting a first set of variable values from the plurality of variable values, wherein the first set of variable values corresponds to a first one of the plurality of variables;
    sorting the first set of variable values based on the clustered plurality of records;
    identifying a set of dominant variable values based on the sorted first set of variable values; and
    positioning the set of dominant variable values in a center position on a vertical axis corresponding to the first variable.

5. The method of claim 4 wherein the generating further comprises:
    reducing the first set of variable values into a second set of variable values by excluding the set of dominant variable values;
    sorting the second set of variable values based on the clustered plurality of records;
    identifying a different set of dominant variable values based on the sorted second set of variable values; and
    positioning the different set of dominant variable values adjacent to the set of dominant variable values on the vertical axis corresponding to the first variable.

6. The method of claim 1 wherein the generating further comprises:
    in response to determining that the adjusted variable value order fails to increase the lucidity score:
        generating a different variable value order of at least one variable;
        computing a different lucidity score based on the different variable value order; and
        providing a different parallel chart to a user based on the different variable value order in response to determining that the different lucidity score is higher than the lucidity score.

7. The method of claim 1 wherein an amount of the plurality of input records corresponds to a user success impracticability threshold.

8. An information handling system comprising:
    one or more processors;
    a memory coupled to at least one of the processors;
    a set of computer program instructions stored in the memory and executed by at least one of the processors in order to perform actions of:

generating a parallel chart based on a plurality of records, wherein each one of the plurality of records comprises a plurality of variable values corresponding to each one of a plurality of variables, and wherein the generating further comprises:
  arranging a variable value order of each one of the plurality of variable values, resulting in a plurality of variable value orders corresponding to the plurality of variables;
  computing a lucidity score of the parallel chart based on the plurality of variable value orders, wherein the lucidity score is a visual clarity measurement of the parallel chart; and
  adjusting at least one of the variable value orders of at least one of the variables to increase the lucidity score of the parallel chart.

9. The information handling system of claim 8 wherein, prior to arranging the variable value order of each one of the plurality of variable values, the processors perform additional actions comprising:
  arranging the plurality of variables in a variable order based on at least one variable arrangement rule selected from the group consisting of a predictor importance rule, an information convergence rule, a feature importance and distinct values number combination rule, and a spindle shape layout rule.

10. The information handling system of claim 8 wherein the processors perform additional actions comprising:
  selecting a first set of variable values and a second set of variable values from the plurality of variable values, wherein the first set of variable values corresponds to a first one of the plurality of variables and the second set of variable values corresponds to a second one of the plurality of variables;
  generating a plurality of line segments between the first set of variable values and the second set of variable values based on the plurality of records;
  in response to detecting one or more line segment crossings of the plurality of line segments, computing one or more weightings of the one or more line segment crossings based on their corresponding intersection angle; and
  computing the lucidity score utilizing the one or more weightings.

11. The information handling system of claim 8 wherein the processors perform additional actions comprising:
  clustering the plurality of records using a centroid-based cluster algorithm;
  selecting a first set of variable values from the plurality of variable values, wherein the first set of variable values corresponds to a first one of the plurality of variables;
  sorting the first set of variable values based on the clustered plurality of records;
  identifying a set of dominant variable values based on the sorted first set of variable values; and
  positioning the set of dominant variable values in a center position on a vertical axis corresponding to the first variable.

12. The information handling system of claim 11 wherein the processors perform additional actions comprising:
  reducing the first set of variable values into a second set of variable values by excluding the set of dominant variable values;
  sorting the second set of variable values based on the clustered plurality of records;
  identifying a different set of dominant variable values based on the sorted second set of variable values; and
  positioning the different set of dominant variable values adjacent to the set of dominant variable values on the vertical axis corresponding to the first variable.

13. The information handling system of claim 8 wherein the processors perform additional actions comprising:
  in response to determining that the adjusted variable value order fails to increase the lucidity score:
    generating a different variable value order of at least one variable;
    computing a different lucidity score based on the different variable value order; and
    providing a different parallel chart to a user based on the different variable value order in response to determining that the different lucidity score is higher than the lucidity score.

14. The information handling system of claim 8 wherein an amount of the plurality of input records corresponds to a user success impracticability threshold.

15. A computer program product stored in a computer readable storage medium, comprising computer program code that, when executed by an information handling system, causes the information handling system to perform actions comprising:
  generating a parallel chart based on a plurality of records, wherein each one of the plurality of records comprises a plurality of variable values corresponding to each one of a plurality of variables, and wherein the generating further comprises:
    arranging a variable value order of each one of the plurality of variable values, resulting in a plurality of variable value orders corresponding to the plurality of variables;
    computing a lucidity score of the parallel chart based on the plurality of variable value orders, wherein the lucidity score is a visual clarity measurement of the parallel chart; and
    adjusting at least one of the variable value orders of at least one of the variables to increase the lucidity score of the parallel chart.

16. The computer program product of claim 15 wherein, prior to arranging the variable value order of each one of the plurality of variable values, the information handling system performs further actions comprising:
  arranging the plurality of variables in a variable order based on at least one variable arrangement rule selected from the group consisting of a predictor importance rule, an information convergence rule, a feature importance and distinct values number combination rule, and a spindle shape layout rule.

17. The computer program product of claim 15 wherein the information handling system performs further actions comprising:
  selecting a first set of variable values and a second set of variable values from the plurality of variable values, wherein the first set of variable values corresponds to a first one of the plurality of variables and the second set of variable values corresponds to a second one of the plurality of variables;
  generating a plurality of line segments between the first set of variable values and the second set of variable values based on the plurality of records;
  in response to detecting one or more line segment crossings of the plurality of line segments, computing one or more weightings of the one or more line segment crossings based on their corresponding intersection angle; and computing the lucidity score utilizing the one or more weightings.

18. The computer program product of claim 15 wherein the information handling system performs further actions comprising:
   clustering the plurality of records using a centroid-based cluster algorithm;
   selecting a first set of variable values from the plurality of variable values, wherein the first set of variable values corresponds to a first one of the plurality of variables;
   sorting the first set of variable values based on the clustered plurality of records;
   identifying a set of dominant variable values based on the sorted first set of variable values; and
   positioning the set of dominant variable values in a center position on a vertical axis corresponding to the first variable.

19. The computer program product of claim 18 wherein the information handling system performs further actions comprising:
   reducing the first set of variable values into a second set of variable values by excluding the set of dominant variable values;
   sorting the second set of variable values based on the clustered plurality of records;
   identifying a different set of dominant variable values based on the sorted second set of variable values; and
   positioning the different set of dominant variable values adjacent to the set of dominant variable values on the vertical axis corresponding to the first variable.

20. The computer program product of claim 15 wherein the information handling system performs further actions comprising:
   in response to determining that the adjusted variable value order fails to increase the lucidity score:
      generating a different variable value order of at least one variable;
      computing a different lucidity score based on the different variable value order; and
      providing a different parallel chart to a user based on the different variable value order in response to determining that the different lucidity score is higher than the lucidity score.

* * * * *